J. R. SERGEANT.
SHIFTING HARROW ATTACHMENT FOR DOUBLE PLOWS.
APPLICATION FILED JUNE 8, 1916.
1,213,912.
Patented Jan. 30, 1917.
2 SHEETS—SHEET 2.
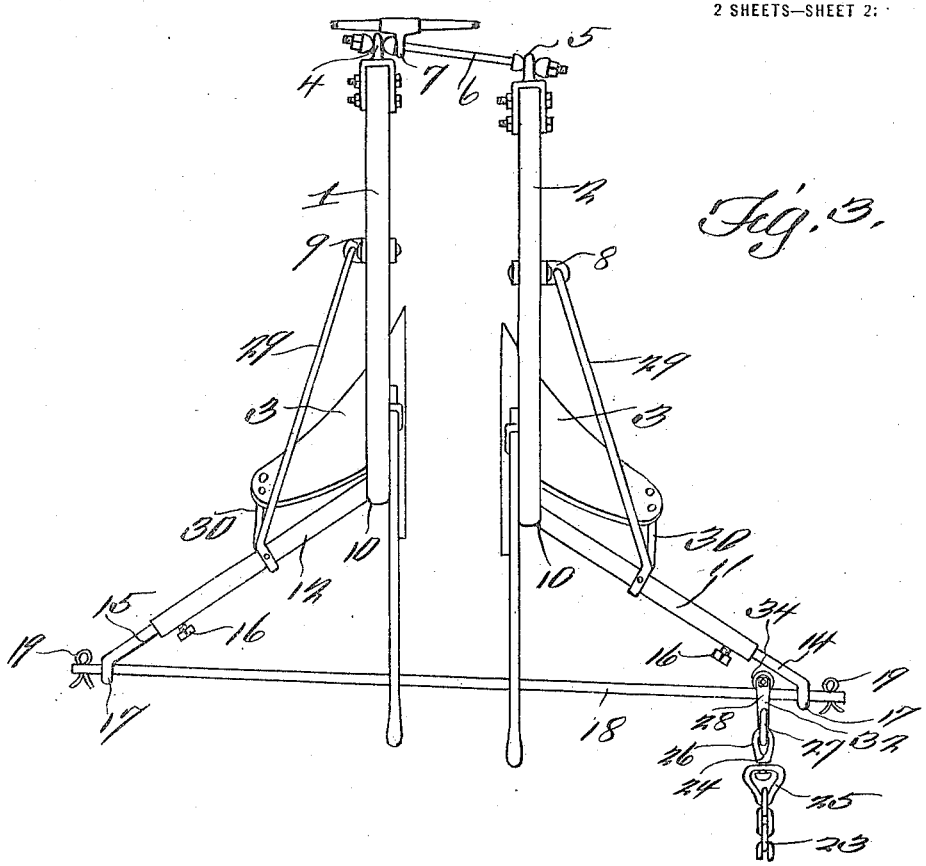
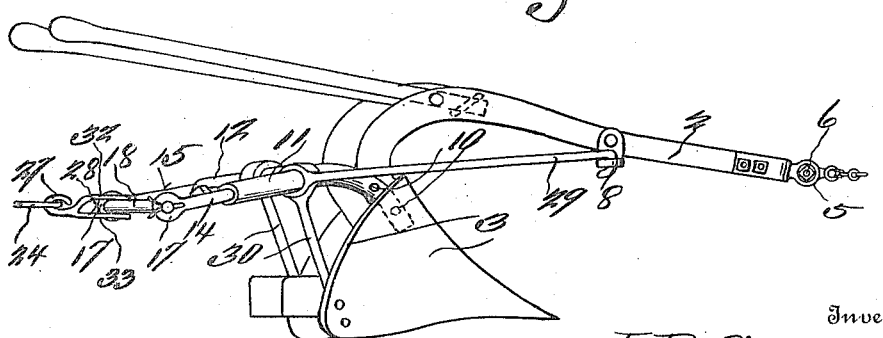

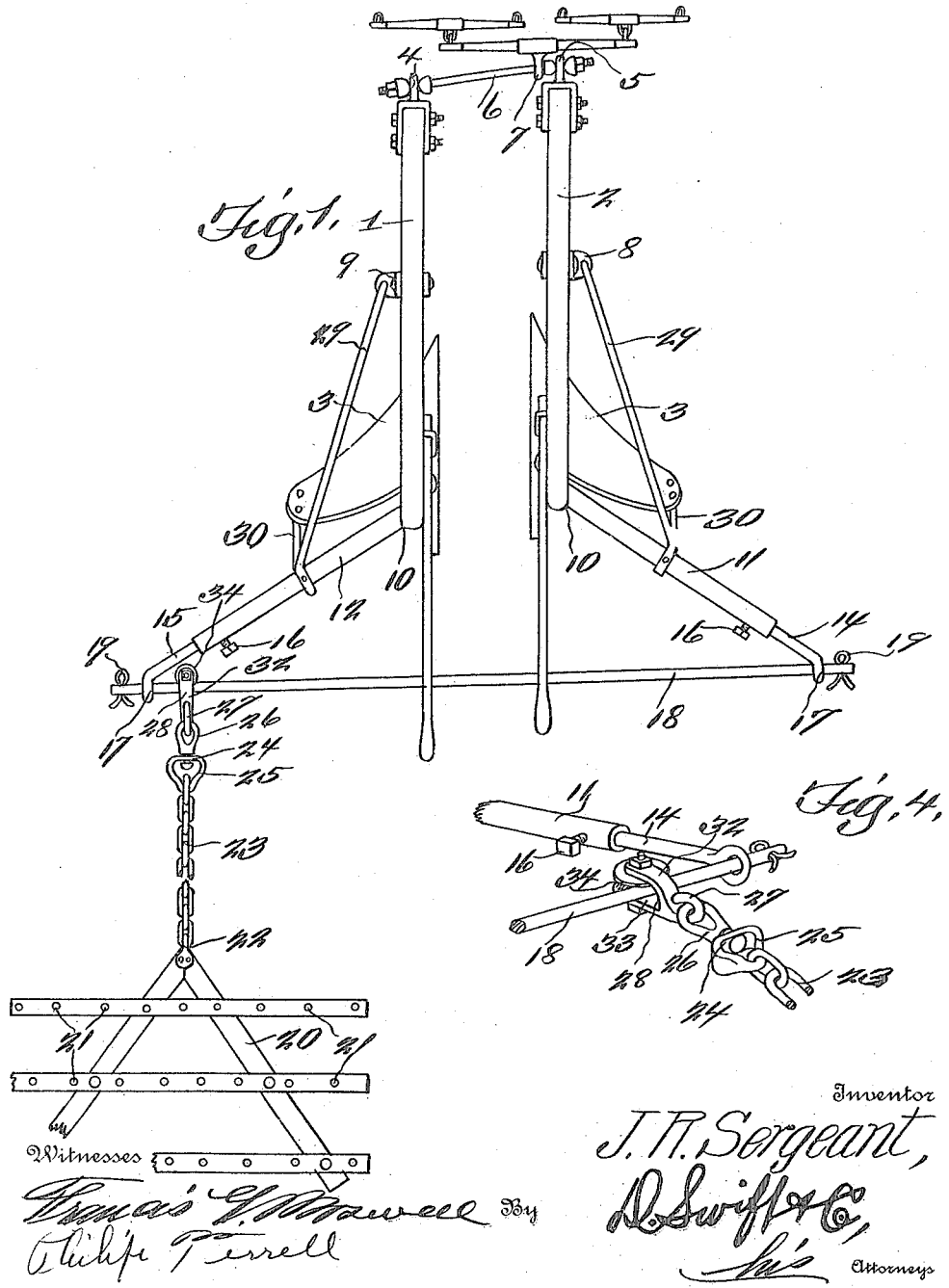

UNITED STATES PATENT OFFICE.

JASPER RAY SERGEANT, OF FORT MORGAN, COLORADO.

SHIFTING HARROW ATTACHMENT FOR DOUBLE PLOWS.

1,213,912.　　　　Specification of Letters Patent.　　Patented Jan. 30, 1917.

Application filed June 8, 1916.　Serial No. 102,508.

*To all whom it may concern:*

Be it known that I, JASPER R. SERGEANT, a citizen of the United States, residing at Fort Morgan, in the county of Morgan, State of Colorado, have invented a new and useful Shifting Harrow Attachment for Double Plows; and I do hereby declare the following to be a full, clear, and exact description of the invention, such as will enable others skilled in the art to which it appertains to make and use the same.

This invention relates to the art of farming implements, more particularly to a gang of double or two-way plows, and more especially to an automatically shifting harrow attachment therefor.

One of the objects of the invention is to provide a harrow attachment automatic in its shifting and carried by the frame of the plows, to facilitate the pulverizing of the soil.

Another object of the invention is to provide a harrow attachment of this kind adapted to shift to one side or the other automatically, at each end of the furrow, so as to pulverize the soil adjacent one furrow and then the other.

Another object of the invention is to provide a device of this kind which is simple, efficient and practical in construction.

In practical fields the details of construction may necessitate alterations falling within the scope of what is claimed.

The invention comprises further features and combination of parts as hereinafter set forth, shown in the drawings and claimed.

In the drawings:—Figure 1 is a plan view of a gang or two-way plow and the harrow attachment constructed in accordance with the invention. Fig. 2 is a view in side elevation. Fig. 3 is a plan view showing the harrow attachment as having been shifted. Fig. 4 is a detail sectional view of one of the laterally and rearwardly extending members, which carries the rear transverse rod, to which in turn the harrow is attached.

Referring more especially to the drawings 1 and 2 designate the usual form of plow beams, which are arranged in parallelism and have their legs provided with the usual plows 3. The forward ends of the plow beams are provided with loops 4 and 5, through which the shifting rod 6 extends, on which rod the connection or clevis member 7 is arranged, which clevis member is carried by the usual draft equalizer. Secured to the plow beams 1 and 2 are the plates 9 and 8.

Secured at 10 to the rear ends of the plow beams are the arched bars 11 and 12, which diverge rearwardly in plan view and are arched in side view. The rear portions of the bars 11 and 12 are hollow and receive the telescoping extensions 14 and 15, which are held in adjusted positions in the hollow extremities of the bars 11 and 12 by the pins or set screws or bolts 16. The rear extremities of the extensions 14 and 15 are provided with eyes 17, through which the transverse elongated rod 18 extends, there being suitable cotter pins 19 carried by the ends of the elongated transversely disposed rod 18, thereby preventing movement of the rod. A harrow 20 is provided having upwardly and downwardly extending teeth 21, whereby the harrow may be inverted. Connected to the harrow 20 by means of clevis 22 is a chain 23, to the end of which a swiveling device 24 is attached. This swiveling device 24 consists of the two parts 25 and 26 swiveled together as shown. The part or loop 26 is engaged by the hook 27 of the eye 28, through which the rod 18 extends, so that the eye 28 may slide from one end to the other on the rod 18. It is to be noted that the bars 11 and 12 are braced by the rods 29, which connect, as shown to the plates 8 and 9. Said bars 11 and 12 are additionally braced by the rods 30, which in turn connect to the outer rear ends of the mold board of the plows. It is to be seen that when the plows reach the end of a furrow, and the plows are in the act of turning, the harrow will automatically shift, through the medium of the eye 28, particularly owing to the fact that when the team or draft animals turn, the draft equalizer will shift toward the other end of the rod 6, thereby reversing the plow beams one in advance of the other, from that shown in Fig. 1 to that shown in Fig. 3. The shifting of the plow beams in this manner, will change the inclination of the rod 18, which will cause the eye 28 to shift to the opposite end of the rod. This eye 28 consists of the upper and lower part 32 and 33, between which the grooved rollers 34 are journaled, which rollers engage the opposite sides of the rod 18, thereby permitting easy shifting.

The invention having been set forth what is claimed as new and useful is:—

1. In a device as set forth, the combination of a pair of plows, the beams of which are arranged in parallelism and means connecting the forward ends of the beams, whereby the plows may shift automatically one in advance of the other, with a pair of diverging bars, one carried by the rear extremity of each beam, means connecting the rear ends of the bars, and a harrow having slidable connection with the last named means, whereby the harrow may be shifted to one side or the other.

2. In a device as set forth, the combination of a pair of plows, the beams of which are disposed in parallelism with each other and a rod loosely connecting the forward ends of the beams, with a pair of diverging bars, one being carried by the rear extremity of each beam, a connection between the rear extremities of said bars, said connection consisting of a transverse rod, and a harrow having means provided with a slidable connection with said rod, whereby the harrow may shift to one side or the other.

3. In a device as set forth, the combination of a pair of plows, the beams of which are arranged in parallelism and a rod loosely connecting the forward ends of the beams, whereby the plows may shift automatically one in advance of the other, with a pair of diverging bars, one being carried by the rear extremity of each beam, the rear portion of each bar being hollow, extensions telescopically mounted in said hollow portions, means for holding said extensions adjustably in said hollow portions, a rod connecting the rear extremities of said extensions loosely, a harrow having a connection slidable on the rod, whereby the harrow may shift to one side or the other, as the beams are shifted.

In testimony whereof I have signed my name to this specification in the presence of two subscribing witnesses.

JASPER RAY SERGEANT.

Witnesses:
W. A. SERGEANT,
C. E. WALKER.

Copies of this patent may be obtained for five cents each, by addressing the "Commissioner of Patents, Washington, D. C."